United States Patent [19]

Hill

[11] 4,295,616
[45] Oct. 20, 1981

[54] CHOPPING MECHANISM WITH REMOTE SHEARBAR ADJUSTER

[75] Inventor: Amos G. Hill, Hesston, Kans.
[73] Assignee: Hesston Corporation, Hesston, Kans.
[21] Appl. No.: 81,839
[22] Filed: Oct. 4, 1979
[51] Int. Cl.³ ............................................ B02C 18/16
[52] U.S. Cl. .................................... 241/241; 241/222; 241/286
[58] Field of Search ............... 241/286, 221, 222, 223, 241/101.7, 241

[56] References Cited

U.S. PATENT DOCUMENTS

| | | | |
|---|---|---|---|
| 2,824,704 | 2/1958 | Hanse et al. | 241/286 |
| 3,342,231 | 9/1967 | Waldrop | 241/286 X |
| 4,190,209 | 2/1980 | DeBuhr et al. | 241/286 X |

*Primary Examiner*—Mark Rosenbaum
*Attorney, Agent, or Firm*—Schmidt, Johnson, Hovey & Williams

[57] ABSTRACT

The shearbar of a forage chopper, positioned in such a way that direct access thereto for adjustment purposes is obstructed by other adjacent structures and mechanisms, is provided with an adjuster which may be manipulated at a point remote from the shearbar itself under conditions providing free, uninhibited access to the adjuster. A cam in the nature of a wedge is shifted infinitely along a path of travel that causes responsive shifting of the shearbar assembly along a path of travel extending toward and away from the chopper when a setscrew is released to permit such shifting on the part of the assembly.

8 Claims, 5 Drawing Figures

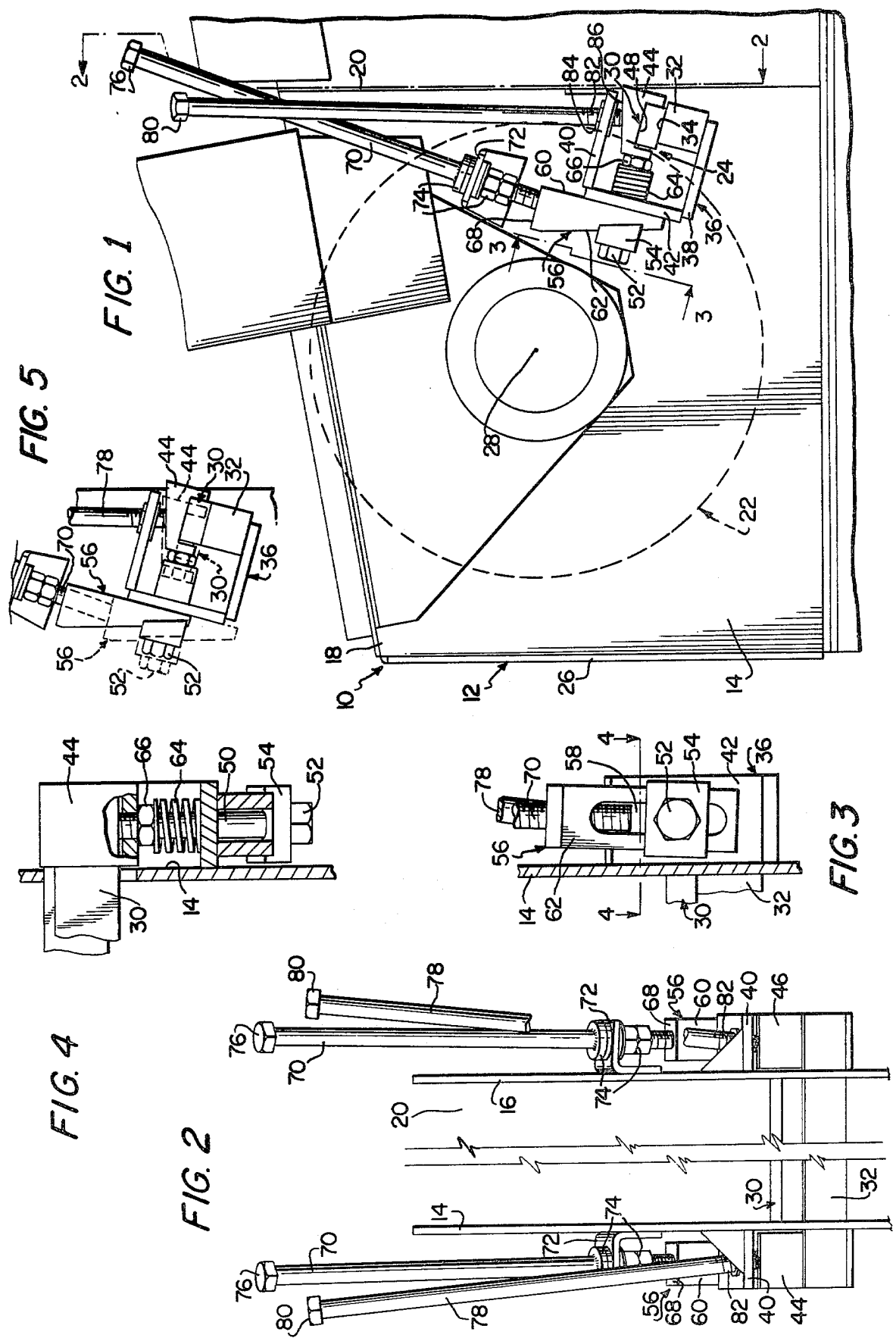

CHOPPING MECHANISM WITH REMOTE SHEARBAR ADJUSTER

TECHNICAL FIELD

This invention relates to harvesting equipment, and more particularly, to unique means for adjusting the position of a shearbar with respect to its cooperating chopper on forage harvesting equipment.

BACKGROUND ART

Forage choppers typically employ chopping "cylinders" which rotate at high speeds and cooperate with stationary shearbars to chop incoming crop stalks and the like into small segments. The relationship of the shearbar to the knives of the cylinder is critical to achieving proper severance and uniform length of chopped segments. Thus, it is essential that the position of the shearbar be adjustable with respect to the chopper so that accommodations can be made as may be necessary or desirable for wear on the part of the knives and the shearbar tending to militate against the quality of chop obtained. In some situations, however, the shearbar is located in an area in which direct access thereto is obstructed by adjacent equipment and structures, making adjustment difficult and tending to discourage proper periodic adjustment. Furthermore, the degree of accuracy and precision involved in prior adjustments has not been all together optimum.

SUMMARY OF THE PRESENT INVENTION

Accordingly, one object of the present invention is to provide a shearbar adjusting arrangement which, by its inherent ease of use, ready accessibility and precision control encourages frequency of shearbar adjustment that is consistent with the goals of obtaining high quality chopping performance.

Pursuant to the foregoing, the present invention contemplates a pair of adjusters at opposite ends of the shearbar assembly, each including a long, generally upstanding operating member having a head rising above the chopper box or housing on which the adjusters are mounted. A similarly positioned, long setscrew associated with each adjuster is likewise positioned with its head above the chopper box for ease of manipulation and accessibility, it being possible when the setscrews are loosened to individually rotate the adjuster members with a wrench or the like to in turn shift a cam of each adjuster in a direction which either draws the shearbar closer to the chopping cylinder or allows a spring of the adjuster to push the shearbar back out away from the cylinder. As a result of the special geometrical relationship between the setscrew of each adjuster, the surface which it normally engages, and the path of travel of such surface with the shearbar, the latter is not only clamped by the setscrew against accidental movement into the cylinder, but is also positively stopped against such movement when the setscrew is properly positioned.

BRIEF DESCRIPTION OF THE DRAWING

FIG. 1 is a fragmentary, side elevational view of the chopper mechanism of a typical forage harvester, said mechanism employing shearbar adjusters in accordance with the principles of the present invention;

FIG. 2 is a fragmentary, end elevational view thereof taken from the entry end of the chopper box or housing;

FIG. 3 is an enlarged, fragmentary, detail view of an adjuster taken substantially along line 3—3 of FIG. 1;

FIG. 4 is an enlarged, fragmentary, cross-sectional view of the adjuster of FIG. 3 taken substantially along line 4—4 thereof; and FIG. 5 is a fragmentary, elevational view of one of the adjusters utilizing phantom lines to illustrate alternative positions for the various components thereof.

DETAILED DESCRIPTION

The chopping mechanism 10 includes a housing 12 provided with a pair of spaced apart sidewalls 14 and 16 and a topwall 18 spanning the sidewalls 14,16. The housing 12 has an opening 20 defined between the sidewalls 14,16 and below the topwall 18 at one end of the housing 12. The opening 20 is adapted to permit the entry of crop material into the housing 12 for severance by a rotating chopping cylinder 22 in cooperation with a shearbar assembly 24. The chopped material leaves the housing 12 via the opposite end thereof through an outlet 26.

The cylinder 22 spans the housing 12 and is suitably supported at its opposite ends by the sidewalls 14,16. Likewise, the shearbar assembly 24 spans the housing 12 at a point below the axis of rotation 28 of the cylinder 22 and rearwardly adjacent the opening 20, effectively forming the lower limit of the opening 20. Thus, crop material entering the housing 12 passes over the shearbar assembly 24.

The shearbar assembly 24 includes a shearbar 30 of elongated nature and rectangular, transverse cross-sectional configuration, the shearbar 30 projecting for a short distance outwardly beyond respective ones of the sidewalls 14,16 and resting upon a heavy-duty support bar 32 likewise traversing the housing 12 and extending outwardly beyond the sidewalls 14,16. The support bar 32 is fixedly attached to the housing 12 and has an uppermost, flat surface 34 inclined upwardly toward the cylinder 22 and slideably supporting the shearbar 30 for transverse movement thereof along a path of travel extending toward and away from the cylinder 22. Each end of the support bar 32 is provided with a generally U-shaped bracket 36 welded or otherwise fixed to the corresponding sidewall 14 or 16 and including a lower rigid leg 38 projecting from beneath the proximal end of the support bar 32 generally toward the outlet 26, an upper rigid leg 40 spaced above the shearbar 30 and extending in parallelism with the lower leg 38, and a rigid bight 42 interconnecting the legs 38 and 40 adjacent the ends thereof which are remote from the opening 20. The bight 42 extends at right angles to the legs 38 and 40.

In addition to shearbar 30, the assembly 24 further includes a pair of inverted, generally C-shaped blocks 44 and 46 at opposite ends of the shearbar 30 and having downwardly facing notches 48 that receive respective, corresponding portions of opposite ends of the shearbar 30. The assembly 24 further includes a shank 50 projecting rearwardly from each block 44 respectively and threaded into the latter against the proximal side of the shearbar 30 so as to effectively clamp the latter tightly against the opposite side of the notch 48. Thus, the shanks 50, the blocks 44,46, and the shearbar 30 all become rigidly attached together and move as a unit when the shearbar 30 is shifted toward and away from the cylinder 22 along a path of travel defined by the top surface 34 of the support bar 32.

Each shank 50 passes freely through the bight 42 of the corresponding bracket 36 and terminates in an outermost head 52 spaced beyond the bight 42. A shoulder 54 is disposed inwardly of the head 52 on the shank 50 and bears against a cam wedge 56 which in turn bears against the bight 42 forming a second shoulder. Both the shoulder 54 and the cam wedge 56 are suitably perforated to provide passage therethrough of the shank 50, the perforation in the cam wedge 56 being in the nature of a slot 58 extending longitudinally of the cam wedge 56.

The two cam wedges 56 on opposite sides of the housing 12, together with the support bar 32 and brackets 36, form part of what may be referred to as adjusters for the shearbar assembly 24 for controlling and effecting shifting of the latter along the top surface 34 of the support bar 32. Each cam wedge 56 has one face 60 which is parallel to the corresponding bight 42 and slidingly bears against the latter during shifting of the cam wedge 56 along a path of travel transverse to the path of travel of the shearbar assembly 24. An opposite face 62 of each cam wedge 56 is inclined with respect to the face 60 thereof and converges toward the latter as the normally lower end of the cam wedge 56 is approached, the slanted face 62 bearing against a similarly inclined surface of the corresponding shoulder 54. A compression spring 64 encircles each shank 50 and is located between the bight 42 on the one hand and an abutment 66 on the shank 50 on the other hand. Consequently, the springs 64 on the two opposite sides of the housing 12 yieldably bias the shearbar assembly 24 in a direction away from the cylinder 22.

Each cam wedge 56 has a normally upper end 68 threadably receiving the lower threaded end of an elongated operating member 70 which extends upwardly for a substantial distance above and beyond the topwall 18 of housing 12. Each operating member 70 is rotatably attached to the corresponding sidewall 14 or 16 via a lug 72 which, in cooperation with structure broadly denoted by the numeral 74 and located on opposite upper and lower sides of the lug 72, prevents axial shifting of the member 70 during rotation thereof about its longitudinal axis or otherwise. A head 76 at the uppermost end of the member 70 is adapted to receive rotative force thereto applied via a wrench or the like.

Each side of the housing 12 is also provided with a long, upstanding setscrew 78 having a head 80 at its uppermost end spaced above the topwall 18 of the housing 12 for accessibility and in generally close proximity to the head 76 of the corresponding operating member 70. Each setscrew 78 has a lowermost threaded end 82 passing obliquely through but in threaded relationship with a mating nut 84 held captive within an aperture of the upper leg 40 of the corresponding bracket 36. The lowermost threaded end 82 of the setscrew 78 makes clamping engagement with the top, inclined surface 86 of the corresponding block 44, said surface 86 being inclined with respect to the shearbar 30 but in actuality being substantially parallel to the engaging end 82 of the setscrew 78. Thus, the setscrew 78 approaches the shearbar assembly 24 at an acute angle to the path of travel of the latter as measured on the side of the setscrew 78 facing the cylinder 22, i.e., in the direction of shifting of the shearbar 30 toward the cylinder 22. This geometrical relationship effectively forms a positive stop against movement of the shearbar assembly 24 toward and into the cylinder 22 when the setscrews 78 are in engagement with their corresponding blocks 44.

OPERATION

The operation of the shearbar adjusters as hereinabove described should be apparent from the foregoing description. Thus, the manner of use thereof will only be briefly outlined as follows.

If the quality of cut of forage materials entering the mechanism 10 becomes such as to require adjustment of the shearbar 30, it is first necessary to operate the setscrews 78 in directions which cause their lower ends 82 to back off the surfaces 86 of the corresponding blocks 44, 46. Thereupon, by rotating the members 70 via their heads 76 in one direction, the cam wedges 56 will be threaded downwardly further between the shoulders 54 and the bights 42 of brackets 36. Consequently, the faces 62 of wedges 56 change position as illustrated in FIG. 5, camming the shoulders 54 and hence the shanks 50 in a direction which causes the entire assembly 24 to move inwardly toward the cylinder 22. Thus, the shearbar 30 itself is brought closer to the cylinder 22 to improve the severing action taking place between the cylinder 22 and the shearbar 30. Tightening down of the setscrews 78 will firmly fix the shearbar assembly 24 in the selected position.

In all likelihood, adjustments will be made to opposite ends of the shearbar 30 independently of one another and on a successive basis. Inasmuch as there are two sets of setscrews 78 and operating members 70, the angle at which the shearbar 30 approaches the cylinder 22 along the length of the latter may also be adjusted to the extent necessary.

In the event that it is desired to back off the shearbar 30 from the cylinder 22, it is but necessary to rotate the operating members 70 in an opposite direction from that above described, thereby raising the cam wedges 56 to a certain extent, permitting the springs 64 to shift the shanks 50 away from the cylinder 22 as the shoulders 54 are maintained in engagement with the sloping faces 62 of the cam wedges 56. Consequently, the shearbar 30 becomes backed off to the extent permitted by the faces 62 of the cam wedges 56. Thereupon, the setscrews 78 may be tightened down against the blocks 44.

It is to be noted that in addition to significant ease of adjustment and accessibility, the present arrangement also permits fine, accurate adjustments. In this regard, it will be appreciated that movement of the cam wedges 56 linearly between the shoulders 54 and the bights 42 is controlled by the pitch of the threads on the members 70, it being possible to obtain very little movement of the wedges 56 per each revolution of the member 70 if desired. Likewise, the angle of slope of the faces 62 has a bearing on the displacement of the shearbar 30 toward and away from the cylinder 22 relative to the linear movement of the cam wedges 56. All of these factors may be carefully coordinated in such a manner to obtain very fine, accurate adjustment of the shearbar 30 if such is desired.

Furthermore, it is to be appreciated that the present invention completely avoids sloppiness and loose fitting between interacting components such that there is no hesitation in the shearbar assembly should its direction of adjustment need to be reversed during movement in one direction. Hence, rapid, accurate and predictable adjustment is possible.

The foregoing results in part from the fact that the springs 64 are constantly biasing the shearbar 30 away from the cam wedges 56, hence taking up any looseness which might otherwise tend to develop. Additionally, each of the structures 74 associated with the members 70 preferably includes nylon friction washers which receive their respective members 70 with sufficient tightness as to prevent free turning thereof. This effectively locks the members 70 against accidental turning during regular operation of the chopping mechanism 10.

I claim:

1. In combination with a rotary chopper and a cooperating shearbar assembly that includes a shearbar and a shoulder movable with said shearbar during adjustment of the latter, an adjuster for controlling the position of said shearbar with respect to said chopper comprising:

a support mounting said shearbar for shifting thereof along a first path of travel extending toward and away from the chopper;

a stationary shoulder disposed in spaced opposition to said movable shoulder and held against said shifting with the shearbar; and a cam wedge operably drivable between said shoulders in engagement therewith along a second, rectilinear path of travel in a direction to effect said shifting of the shearbar, said assembly including means for maintaining said movable shoulder engaged with said wedge.

2. In the combination as claimed in claim 1, wherein said cam wedge is disposed to effect said shifting of the shearbar toward the chopper when the cam wedge is moved in one direction along said second path of travel, said maintaining means being adapted for yieldably shifting the shearbar away from said chopper when the cam wedge is moved in the opposite direction along said second path of travel.

3. In the combination as claimed in claim 1, wherein said assembly includes an abutment movable with the shearbar, said maintaining means including a spring disposed between said stationary shoulder and said abutment.

4. In the combination as claimed in claim 1; and means for releasably clamping said assembly against said support in any one of a number of selected positions along said first path of travel.

5. In the combination as claimed in claim 4, wherein said clamping means includes a setscrew adjustable toward and away from the assembly at an acute angle to said first path of travel with respect to shifting of the assembly toward the chopper, said assembly including a surface disposed for clamping engagement with said setscrew and at substantially right angles with the latter so as to form a positive stop against shifting of the assembly toward the chopper when the setscrew is engaged with said surface.

6. In the combination as claimed in claim 1, wherein said chopper is provided with a housing about the same having an opening for receiving materials to be chopped and a topwall across said opening, said cam wedge being positioned substantially adjacent said assembly and being provided with an elongated operating member for effecting said movement, said member projecting upwardly from said cam wedge and terminating in an uppermost end adjacent said topwall, remote from said assembly and adapted to receive an operating force.

7. In the combination as claimed in claim 6, wherein said member is mounted for rotation about its longitudinal axis and is held against longitudinal movement, said member having a lowermost end threadably engaging said cam wedge for effecting said movement thereof upon rotation of the member about its longitudinal axis.

8. In the combination as claimed in claim 6, wherein said assembly is provided with means for releasably holding the same against said shifting, said holding means including a setscrew having a lowermost end engageable with the assembly and an uppermost end remote from the assembly, adjacent said topwall and adapted to receive an operating force.

* * * * *